Oct. 3, 1961  N. L. DU BOIS  3,003,096
PULSE WIDTH MOTOR CONTROL CIRCUIT
Filed Feb. 6, 1959  3 Sheets-Sheet 2

INVENTOR.
NORMAN L. DUBOIS
BY
ATTORNEY.

Oct. 3, 1961   N. L. DU BOIS   3,003,096
PULSE WIDTH MOTOR CONTROL CIRCUIT
Filed Feb. 6, 1959   3 Sheets-Sheet 3

INVENTOR.
NORMAN L. DuBOIS
BY
ATTORNEY.

United States Patent Office 3,003,096
Patented Oct. 3, 1961

3,003,096
PULSE WIDTH MOTOR CONTROL CIRCUIT
Norman L. Du Bois, Thornwood, N.Y., assignor to General Precision, Inc., a corporation of Delaware
Filed Feb. 6, 1959, Ser. No. 791,623
6 Claims. (Cl. 318—207)

This invention relates to a transistor motor control circuit wherein a train of pulse signals is utilized as the control signal for suitably positioning a motor. More particularly the invention relates to a servo motor control system wherein the control signal constitutes a train of pulses whose width is varied in proportion to an error signal.

It has been found that the efficiency of such pulse-width-controlled transistor amplifiers is high, especially at less than full output, so that they heat less and accordingly have high power capability. The reason is that in pulse-width operation the transistor is either fully conducting and has very low dissipation, or completely non-conducting with no power dissipation. The transistor never operates at an intermediate conductance with accompanying high heat generation.

In one embodiment of the invention the input signal, which may consist of a varying direct voltage, is converted by two saturable transformers into two proportional alternating voltages having peaked waveforms. The signals are converted by a pair of circuits into two pulse trains related in sense and phase in a selected manner. The individual pulses of these trains have variable widths instantaneously representative of the input signal amplitude. These pulses are amplified and voltage limited in transistor stages, the final stage being biased so that no current flows in the absence of a pulse but full current flows during each pulse. The amplifier output is therefore a pulse width modulated signal.

In a second embodiment the modulator which converts the input signal into an alternating current representation thereof is of the photocell type. This has the advantage of being frequency insensitive as well as simple and linear.

The invention is especially applicable to proportional control of two-phase instrument motors and may be incorporated with such a motor in a position or rate servomechanism including a feedback path. However, the power capacity of transistor amplifiers is so extended by applying pulse width proportional control that the motor control of the invention can not only be applied to instrument motors but also can be used to control fractional horsepower motors, and even larger motors. However, when applied to two-phase and three-phase power motors of larger than instrument sizes the instant control should be applied not only to a single winding, but to both or all windings to eliminate heating of windings kept across the line during standstill or slow speed operation.

The purpose of this invention is to provide a high power capacity linear motor control employing a transistor power amplifier stage.

A further understanding of this invention may be secured from the detailed description and associated drawings, in which.

Figure 1:
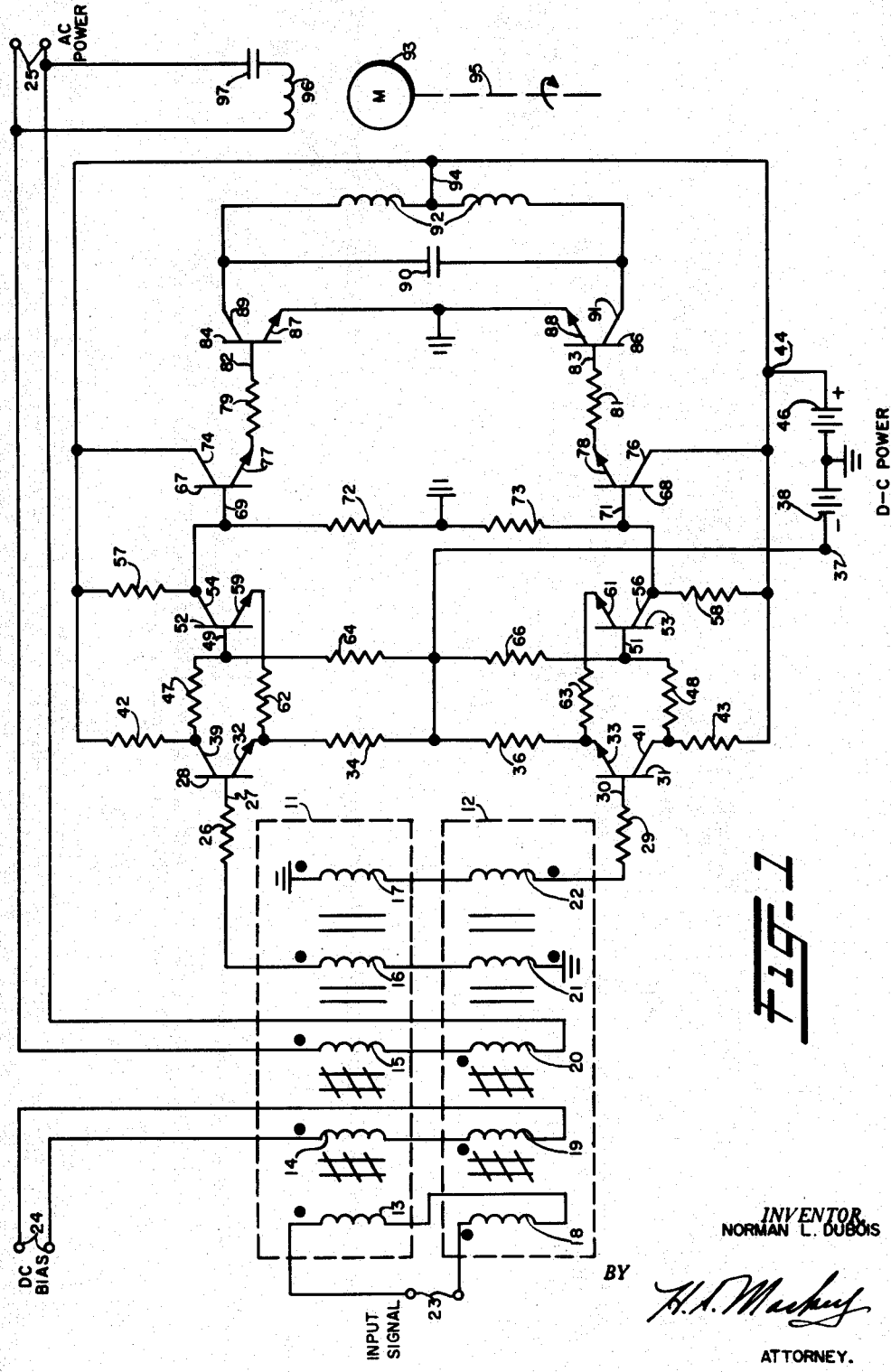
FIGURE 1 is a schematic wiring diagram of a motor control including a magnetic modulator forming one embodiment of the invention.

Referring now to FIG. 1, a magnetic modulator contains two separate units respectively indicated by the components within the dashed rectangles 11 and 12. The component 11 comprises a single magnetic core provided with five windings 13, 14, 15, 16 and 17. The component 12 is identical and contains a single magnetic core provided with five windings 18, 19, 20, 21 and 22. There is no magnetic coupling whatever between the two sets of windings. The windings are connected in series in pairs, 13 and 18 forming one pair, 14 and 19 another, 15 and 20 another, 16 and 21 another and 17 and 22 the fifth pair. Windings 15, 16 and 17 are mutually inductively related and windings 20, 21 and 22 are mutually inductively related. The series relationship of windings 13 and 18 is opposite to that of windings 14 and 19.

The windings 13 and 18 are connected to a pair of input signal terminals 23. Windings 14 and 19 are connected to the terminals 24 of a direct-current source of bias. Windings 15 and 20 are connected to the terminals 25 of a source of alternating current having a frequency, for example, of 400 c.p.s. Windings 16 and 21 are connected in series opposed relation and provide one output signal, one end being grounded and the other end connected through resistor 26 to the base terminal 27 of a NPN transistor 28. Windings 17 and 22 are likewise connected in series opposed relation and provide the other output signal. One end of winding 17 is grounded and the opposite end of winding 22 is connected through a resistor 29 to the base terminal 30 of a NPN transistor 31. The relative instantaneous polarities of the various windings 13 to 22 inclusive are indicated by dots.

The transistors 28 and 31 are connected as common emitter amplifiers. The emitters 32 and 33 are connected through resistors 34 and 36 to the negative terminal 37 of a grounded battery 38 which may, for example, have a potential of minus 22 volts. The collectors 39 and 41 are connected through load resistors 42 and 43 to the positive terminal 44 of a grounded battery 46 which may have a potential of plus 22 volts. The collectors 39 and 41 are also coupled through resistors 47 and 48 to the respective base terminals 49 and 51 of two NPN transistors 52 and 53. Their collectors 54 and 56 are connected through resistors 57 and 58 to the positive terminal 44 and their emitters 59 and 61 are respectively connected through resistors 62 and 63 to the emitters 32 and 33. The bases 49 and 51 are biased to the negative terminal 37 through resistors 64 and 66.

The transistors 28 and 52 comprise a Schmitt trigger circuit emitting a pulse having a width or time duration dependent upon the time the input signal is in excess of the Schmitt threshold while transistors 31 and 53 comprise another similar Schmitt trigger circuit. In place of this type of circuit, however, may be employed any one of a number of other conventional circuits for generating pulses of controllable width.

The Schmitt trigger circuits are followed by a pair of emitter followers comprising transistors 67 and 68 connected as common collector amplifiers. Collectors 54 and 56 are connected directly to bases 69 and 71 and biased by connecting them through resistors 72 and 73 to ground. Collectors 74 and 76 are connected to the positive terminal 44. The emitters 77 and 78 are coupled through resistors 79 and 81 to the bases 82 and 83 of transistors 84 and 86. Their emitters 87 and 88 are grounded and their collectors 89 and 91 are connected to the end terminals of one winding 92 of a two-phase motor 93. This winding has a center tap 94 connected to the positive terminal 44. A smoothing capacitor 90 tunes or resonates the coil 92 so as to present a purely resistive load to the transistor switches. The motor 93 has its other winding 96 connected through a phase-shifting capacitor 97 to the alternating current terminals 25.

This motor control thus consists of two distinct channels. Modulating windings 16 and 21 apply a signal through Schmitt circuit 28/52, emitter follower 67 and amplifier 84 to one-half of the motor winding 92. Modulator windings 17/22 apply their signal through an entirely separate channel consisting of Schmitt circuit 31/53, emitter follower 68 and amplifier 86 to the other half of center-tapped motor winding 92.

In the operation of the circuit of FIG. 1, with no input signal at terminals 23 and no bias potential at terminals 24, application of alternating potential from terminals 25 induces equal potentials in windings 16, 21, 17 and 22. But the potential of winding 16 being equal and opposite to that of winding 21, they cancel and the potential of base 27 is that of ground. Similarly, the potential of base 30 is at ground. Application of bias voltage to windings 14 and 19 partly and equally saturate the cores, so that although the induced secondary potentials become less, they still cancel. Application of an input signal to windings 13 and 18 causes one core to become more nearly saturated and the other less, so that, for example, the induced potential in winding 16 is greater than that in winding 21 and that in winding 17 is greater than that in winding 22.

Figure 2:
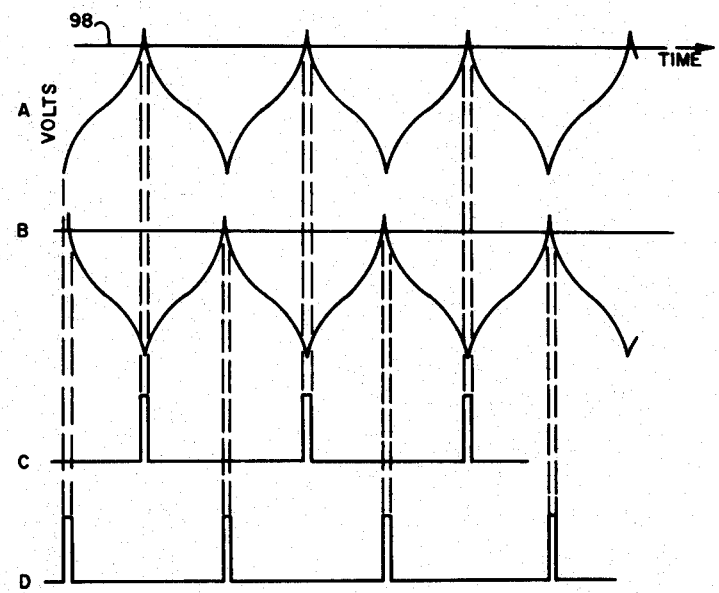
FIGURE 2 is a series of four graphs illustrating the operation of the invention.

The exciting potential applied to primary windings 15 and 20 is purposely made high, so that a high proportion of odd harmonics is produced in the outputs and their waveforms are sharply peaked. FIG. 2 shows this waveform. Graph A depicts the waveform of the potential applied to base 27 and graph B that applied to base 30, having the positive peaks in opposite phase to those of graph A.

In the absence of an input signal at terminal 23 the Schmitt trigger circuit transistors 52 and 53 are conducting and transistors 28 and 31 non-conducting, and bases 27 and 30 are at ground potential. When, therefore, the positive peaks of graph A due to an input signal cross a threshold potential the transistor 28 becomes conductive, causing transistor 52 to become non-conductive and the potential of collector 54 to become that of its supply battery terminal 44. The reverse action occurs and the Schmitt circuit reverts to normal condition when the exciting peak has again fallen below the threshold value. This is indicated at potential level 98 in graph A and the ensuing collector potential pulse is shown in graph C. The negative peaks do not trigger the Schmitt circuit.

The same input signal induces similar action but at opposite phase in the other amplifier channel. The input signal causes the waveform B, FIG. 2, to be applied to the base 30, FIG. 1. Due to the polarizations of the windings 16, 17, 21 and 22 the positive peaks have a phase opposite to that of the positive peaks shown in graph A applied to base 27. The positive peaks applied to base 30 trigger the Schmitt circuit comprising transistors 31 and 53 to form width-modulated pulses shown in graph D.

The tops of all pulses are constant and limited at the potential of terminal 44 and the bottoms of all pulses are constant and limited at approximately ground, the potential of the bases 69 and 71. The pulse widths are dependent on the positive peak widths at threshold voltage depending on the positive peak heights in accordance with the depicted waveform employed, these peak heights being a direct function of the input signal magnitude. Thus the greater the input signal the wider the pulse signal derived from the Schmitt trigger circuits.

When the polarity of the input signal reverses, the induced potential in winding 21 becomes greater than that in winding 16, and that in winding 22 greater than that in winding 17. Now the graph B represents the potential applied to base 27 and graph A the potential applied to base 30. These phases are of course relative to the reference phase source 25.

The Schmitt trigger circuits drive a pair of emitter followers 67 and 68 which amplify power and provide proper impedance match to the following final stage consisting of transistors 84 and 86. Resistors 79 and 81 may have resistances of 100 ohms each and are required to prevent overloading of transistors 67 and 68. The transistors 84 and 86 apply the pulse power in push-pull to the motor winding 92, and the capacitance of capacitor 90, in combination with the inductance of winding 92, tends to smooth the pulses and make the power flow to the motor more nearly continuous. This, however, does not affect power flow through the transistors 84 and 86, which occurs in pulses such as those shown in graphs C and D.

The smoothed pulses from collector 89 are applied to one end of motor winding 92 and the smoothed pulses from collector 91 are applied to the other end of the same winding. As this is a continuous, center-tapped winding, the two pulse trains, always of opposite phases, cooperate to drive this winding in the same sense, although its two halves are excited in alternation and never simultaneously.

The motor 93 is thereby caused to rotate, so that the speed or power of its shaft 95, constituting the output quantity, is closely proportional to the width of the pulse signals and hence to the amplitude of the input signal at terminals 23. A large amount of motor power can be drawn through the final transistor stage 84/86 because the losses are low. During the occurrence of a pulse signal, the final stage transistors have maximum input positive bias and very low collector-emitter resistances. During the remainder of each cycle, when the pulse signal is absent, the transistors are biased to practically infinite resistance and no appreciable current flows. Thus in both conditions the $RI^2$ loss within the transistor is very low so that it is capable of very high output power capacity.

Figure 3:
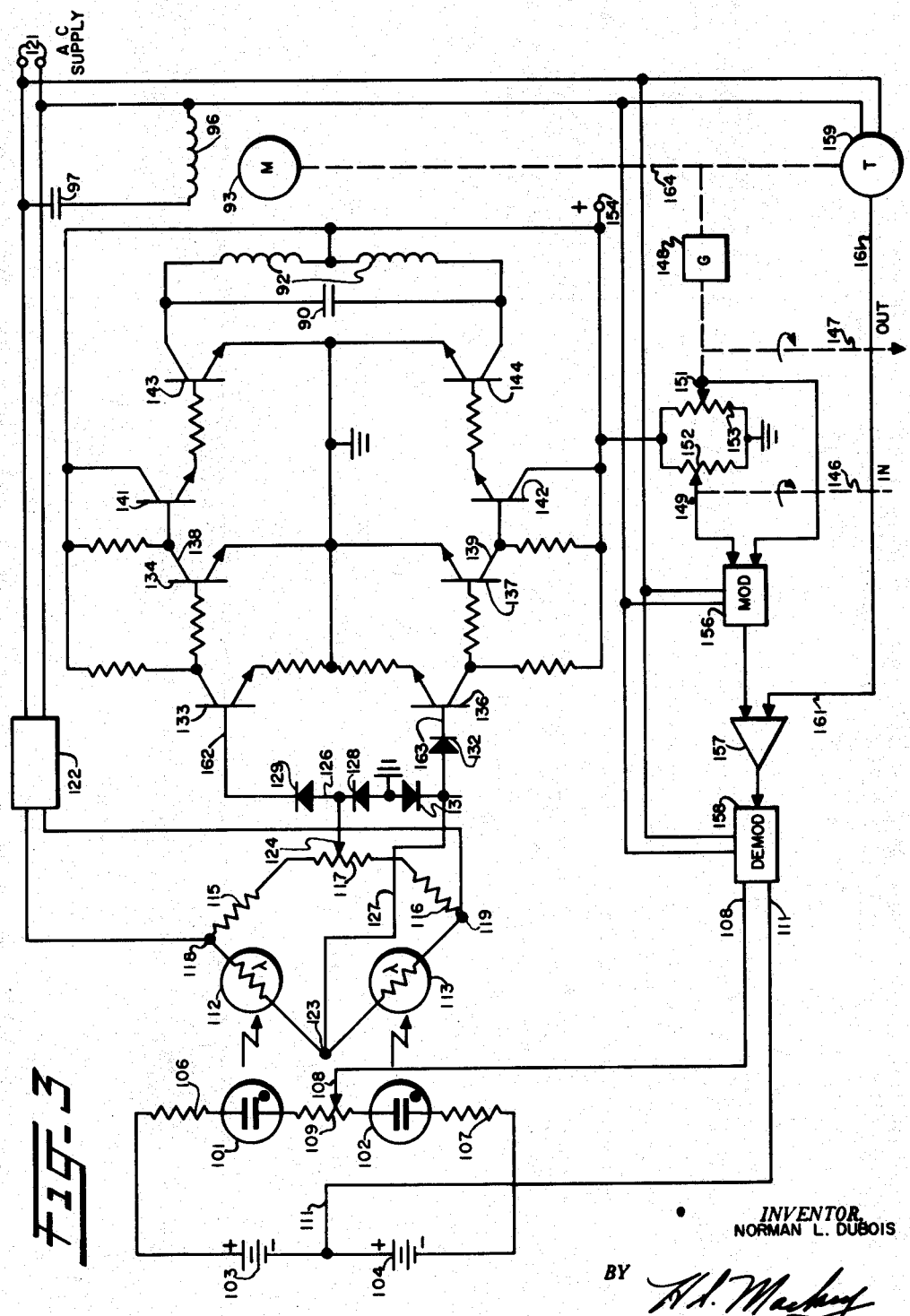
FIGURE 3 is a schematic wiring diagram of a position servomechanism including a photocell modulator forming another embodiment of the invention.

A second embodiment of the invention is depicted in FIG. 3. This embodiment utilizes a photocell modulator having good frequency and amplitude linearities. This figure also indicates one possible use for the invention as a position servomechanism.

The photocell modulator comprises a pair of small neon lamps 101 and 102 energized by direct current from two equal sources of opposite polarities represented by batteries 103 and 104. Connections are made through equal ballast resistors 106 and 107. The junction of the lamps 101 and 102 is connected to one input signal conductor 108, a small balancing potentiometer 109 being provided at this point. The other input conductor 111 is connected to the battery midpoint.

Figure 4:
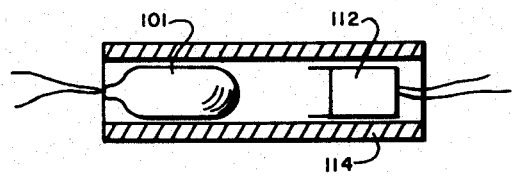
FIGURE 4 depicts an assembly of a neon lamp and a photocell employed in the embodiment of FIG. 3.

A pair of light-sensitive solid-state cells 112 and 113 is provided. They may be, for example, photoconductive cadmium selenide cells such as type CL-3 made by the Clairex Corporation, New York city. These cells are arranged as shown in FIG. 4, neon lamp 101 and selenium cell 112 being contained in a metal tube 114 so that most of the neon light reaches the sensitive end area of the photocell. Neon lamp 102 and photocell 113 are combined in a second, similar metal tube. The two cells 112 and 113 are electrically connected as two arms of a bridge having resistors 115 and 116, FIG. 3, as the other arms. The apex formed by the junction of these two resistors contains a small balancing potentiometer 117. Alternating line potential having a frequency of, say, 400 c.p.s. is applied across the bridge terminals 118 and 119. This potential is secured from alternating current supply terminals 121. A conventional peaking transformer 122 is interposed in the line to provide a peaked waveform high in odd harmonics, such as is shown in FIG. 2A.

The phototube bridge output conductors 126 and 127 are connected to the slider 124 of the potentiometer 117 and junction 123 and the bridge output appearing thereon is applied to a pair of diode rectifying limiters permitting passage of only positive half-cycles. One diode limiter consists of diodes 128 and 129 and the other of diodes 131 and 132. The use of these diode limiters has advantages over use of the rectifying and limiting effects of the transistor bases 27 and 30, FIG. 1, in providing more specific threshold values less affected by environmental changes.

In place of the Schmitt trigger circuits of FIG. 1 high amplification and limiting are employed. This has an advantage over the Schmitt circuit in requiring no negative battery source. The signal from conductor 126 after limiting is amplified in transistors 133 and 134 and the signal from conductor 127 is amplified in transistors 136 and 137. Outputs taken from collectors 138 and 139 are current-amplified in emitter followers 141 and 142, with final amplification in transistors 143 and 144. Outputs are applied in push-pull to a center-tapped motor winding 92, smoothing of the output being accomplished by capacitor 90. Motor 93 has a second phase winding 96 fed through phasing capacitor 97 from the power terminals 121.

The motor 93 together with its proportional pulse-width control circuit starting at input conductors 111 and 108 forms part of a position servomechanism having an angular shaft 146 position input and an angular shaft 147 position output. The shaft 147 is rotated through step-down gears 148 from the motor 93. The two shafts 146 and 147 respectively position the sliders 149 and 151 of two potentiometers 152 and 153. These potentiometers are electrically energized from a direct-current terminal 154 which may, if desired, be the same as that energizing the transistors. The sliders 149 and 151 are electrically connected to actuate a modulator 156 which may, for example, comprise a chopper converting the direct potential difference between sliders 149 and 151 into an alternating potential representative thereof. The modulator 156 output is amplified in amplifier 157, the output of which is demodulated in demodulator 158, reconverting the signal into direct current. The demodulator 158 may also be a chopper operated synchronously with modulator chopper 156 from the 400 cycle line. The direct current output of demodulator 158 is applied to the motor control input lines 108/111. Motor 93 also operates a tachometer 159 which applies a damping signal through conductor 161 to the amplifier 157.

In the operation of this invention the neon lamps 101 and 102 are equally excited in series by the same current magnitude applied from the two batteries 103 and 104 in series. The potentiometer 109 is set so that the signal current applied from conductors 108 and 111 is equally divided between the two lamps. At this setting the circuit constitutes a balanced bridge; the battery current has no tendency to flow in the input signal conductors 108 and 111 since, in operation, they are connected at battery equipotential points. However, the battery and signal direct currents aid each other in passing through one of the neon lamps, and oppose one another in the other lamp. Therefore the current difference through the lamps is directly proportional to the input signal. The light output is proportional to current, so that the difference in intensities of light outputs is also directly proportional to input signal. Also, within limits set by deionization time, this bridge operates as well on alternating as on direct signals, the light outputs then being alternating.

The light from lamp 101 irradiates the photocell 112 associated with it, and controls its resistance. The photocell conductance increases with illumination increase. Parameters are such that the output potential amplitude between conductors 126 and 127 is very nearly linearly proportional to the product of the potential amplitude applied to terminals 118 and 119, and the signal potential amplitude between conductors 108 and 111. The potentiometer 117 is adjusted so that, with equal light inputs, the conductors 126 and 127 are at equipotential points on the bridge with regard to the potential applied between terminals 118 and 119. There is then no cross-coupling, and the frequencies of the signals, if alternating, applied to the two bridges do not appear in the output conductors 126 and 127. Their modulation product frequencies do appear, however. In the present case in which the neon bridge input is direct current and the photocell bridge input is at 400 c.p.s., the output between conductors 126 and 127 is also at 400 c.p.s, and contain all of the odd harmonics applied to the bridge. The waveform is therefore as shown in FIG. 2, with peaks well adapted to form nearly rectangular pulses when highly amplified and limited.

The rectifying and limiting diodes 128 and 129 permit only the positive half-cycles of the waveform of graph A, FIG. 2, to be applied to the base 162 of transistor 133, and have an inherent threshold potential of about one-half volt. Similarly, the diodes 131 and 132 permit positive half-cycles above one-half volt of the waveform of graph B, of opposite phase to that of graph A, to be applied to the base 163 of transistor 136.

The four transistors 133, 134, 141 and 143 constitute a channel amplifying and limiting the positive peaked waveform applied to base 162 to form a nearly rectangular pulse having a width representative of the voltage amplitude of the signal applied to base 162, and an amplitude limited at both top and bottom by the amplifier limiting characteristics over a wide range of input signal intensity. The separate amplifying channel comprising transistors 136, 137, 142 and 144 has similar characteristics. The two channels apply their respective signals, having the forms and phase relations depicted in graphs C and D, FIG. 2, to the ends of the motor winding 92. Thus the same result is secured by use of the modulator and amplifiers of FIG. 3 as was secured by use of those of FIG. 1.

The motor shaft 164 through step-down gears 148 moves potentiometer slider 151, but its movement is limited by the feedback path including the potential of slider 149. When this potential is equalled by that of slider 151, the feedback signal becomes zero and the motor stops. Thus the output shaft 147 follows and initiates in its position that of the input shaft 146.

What is claimed is:

1. A pulse-width motor control comprising, a modulator having a pair of channels, means applying an input control signal having a controlling potential amplitude to said modulator, a transistor amplifier having a pair of channels, voltage limiting means in each of said amplifier channels producing pulse signals having widths representative of the amplitudes of signals applied thereto, means applying the modulated products of said pair of modulator channels respectively to said pair of amplifier channels, a polyphase motor, and means for applying the outputs of said pair of amplifier channels to one phase winding of said polyphase motor for push-pull energization thereof.

2. A pulse-width motor control comprising, a magnetic modulator having first and second channels, means overexciting said modulator with alternating current to generate output waveforms having high odd-harmonic content, means applying an input control signal thereto whereby the modulator output waveforms have peak voltage amplitudes representative of the amplitude of said input control signal, a transistor amplifier having first and second channels each of which includes pulse limiting and shaping circuits whereby output pulse signals are produced whose pulse widths represent input signal amplitudes, means applying the modulated output products of said first and second channels of the modulator to the respective inputs of said first and second channels of the amplifier, a polyphase motor, and means applying the two outputs of said amplifier's first and second channels in push-pull to one phase winding of said motor.

3. A pulse-width motor control comprising, a modulator having at least one electric lamp, means applying an input control signal to said electric lamp, at least one photocell, a light transmission channel from said lamp to said photocell, means applying alternating current having a peaked waveform to said photocell, means securing from said photocell a voltage output representative of the product to said peaked waveform amplitude and said input control signal amplitude, a transistor amplifier having two channels, each of said two channels including pulse limiting and shaping circuits whereby output pulse widths represent input signal amplitudes, means applying said modulator product in push-pull to said two amplifier channel inputs, a polyphase motor, and means applying the two outputs of said amplifier's two channels in push-pull to one phase winding of said motor.

4. A pulse-width motor control comprising, a modulator having first and second light-emitting lamps and first and second photocells, means channelling light from said first lamp to said first photocell, means channelling light from said second lamp to said second photocell, electrical source means biasing said two lamps, means applying an input signal to said two lamps in parallel to produce a difference in illumination representative of signal amplitude with sense of difference representative of signal sense, a four-arm bridge circuit containing said two photocells in two arms thereof and having two pairs of conjugate terminals, means applying power to one said pair of conjugate terminals, a two-channel transistor pulse-width amplifier, said amplifier containing limiters and means converting pulse amplitude signals into pulse width signals, means connecting the other pair of conjugate terminals in push-pull to the inputs of said amplifier, a polyphase motor, and means connecting the outputs of said amplifier in push-pull to one phase winding of said motor.

5. A servo amplifier comprising, a magnetic modulator having a control signal impressed thereon, means for over-exciting said modulator by an alternating current to generate output waveforms having high odd-harmonic content, said modulator including means for generating a pair of peaked output signals of opposite phases and the peak amplitudes of which are representative of the amplitude of said control signal, a transistor amplifier having a pair of parallel channels each of which has one of said peaked output signals impressed thereon, each of said channels including limiting and shaping circuits converting said peaked output signals into trains of pulse signals the pulse widths of which are representative of the peak amplitudes of said peaked output signals, and utilization means having said train of pulse signals impressed thereon in push-pull.

6. A servo amplifier comprising, a modulator including a pair of light emitting lamps each of which has the light thereof channelled to a respective one of a pair of photocells, means for applying a bias potential to said lamps, means applying an input signal to said lamps in parallel to produce a difference in illumination representative of the amplitude of said input signal, a four arm bridge circuit including respective ones of said pair of photocells in each of two arms thereof, means applying an alternating current having a peaked waveform to a pair of conjugate terminals of said bridge circuit, a transistor amplifier having a pair of channels connected to respective one of the other pair of conjugate terminals of said bridge circuit, each of said channels including means for converting peaked waveform signals into pulse signals the pulse widths of which are representative of the peak amplitude of said peaked waveform signals, and utilization means connected in push-pull to the output of said transistor amplifier.

References Cited in the file of this patent

UNITED STATES PATENTS

| | | |
|---|---|---|
| 2,740,086 | Evans et al. | Mar. 27, 1956 |
| 2,809,339 | Guggi | Oct. 8, 1957 |
| 2,886,754 | Ehret | May 12, 1959 |
| 2,896,149 | Lowry et al. | July 21, 1959 |
| 2,945,996 | Norton et al. | July 19, 1960 |
| 2,956,222 | Hill et al. | Oct. 11, 1960 |